US012039505B2

(12) United States Patent
Sukhija et al.

(10) Patent No.: US 12,039,505 B2
(45) Date of Patent: *Jul. 16, 2024

(54) SYSTEM, METHOD, AND COMPUTER PROGRAM PRODUCT FOR UPDATING AN APPLICATION PROGRAMMING INTERFACE FIELD OF A TRANSACTION MESSAGE

(71) Applicant: Visa International Service Association, San Francisco, CA (US)

(72) Inventors: Rohit Sukhija, Bangalore (IN); Pragathi M S, Bangalore (IN)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/118,931

(22) Filed: Mar. 8, 2023

(65) Prior Publication Data
US 2023/0222459 A1    Jul. 13, 2023

Related U.S. Application Data

(63) Continuation of application No. 16/711,530, filed on Dec. 12, 2019, now Pat. No. 11,636,449.

(51) Int. Cl.
*G06Q 40/00* (2023.01)
*G06F 9/54* (2006.01)
*G06Q 20/08* (2012.01)

(52) U.S. Cl.
CPC ........... *G06Q 20/085* (2013.01); *G06F 9/547* (2013.01)

(58) Field of Classification Search
CPC .. G06Q 20/085; G06Q 20/027; G06Q 20/204; G06Q 20/326; G06Q 20/327;
(Continued)

(56) References Cited

U.S. PATENT DOCUMENTS

| 5,996,076 A | 11/1999 | Rowney et al. |
| 6,373,950 B1 | 4/2002 | Rowney |

(Continued)

OTHER PUBLICATIONS

E-Payment System Using SMS Gateway and Line Application; 2018 International Conference on Information and Communication Technology for the Muslim World (ICT4M) (pp. 173-178); Emir Husni, Muhammad Ayat Hidayat; Jul. 23, 2018. (Year: 2018).*

(Continued)

*Primary Examiner* — Tien C Nguyen
(74) *Attorney, Agent, or Firm* — The Webb Law Firm

(57) ABSTRACT

Methods for updating an application programming interface (API) field of a transaction message may include receiving, with at least one processor, a payment transaction message, wherein the payment transaction message comprises data associated with a payment transaction; determining, with at least one processor, one or more API fields of the payment transaction message based on the data associated with the payment transaction; and modifying, with at least one processor, one or more API fields of the payment transaction message. Methods may also include transmitting, with at least one processor, a modified payment transaction message based on modifying the one or more API fields of the payment transaction message. Systems and computer program products are also disclosed.

20 Claims, 10 Drawing Sheets

(58) Field of Classification Search
CPC .... G06Q 20/363; G06Q 20/386; G06F 9/547; G06F 9/546; G07G 1/0036
USPC .............. 705/37, 38, 36, 40, 45, 71, 26, 39; 713/170, 42; 710/1; 370/352; 709/238; 379/221, 9; 455/433; 235/378, 379
See application file for complete search history.

(56) References Cited

U.S. PATENT DOCUMENTS

| | | | | |
|---|---|---|---|---|
| 7,184,538 | B1* | 2/2007 | Doskow | H04Q 3/0025 379/221.09 |
| 7,218,613 | B1* | 5/2007 | Doskow | H04M 7/126 370/252 |
| 7,360,090 | B1* | 4/2008 | Doskow | H04Q 3/0025 713/170 |
| 2001/0029182 | A1* | 10/2001 | McCann | H04Q 3/0025 455/433 |
| 2004/0261116 | A1 | 12/2004 | Mckeown et al. | |
| 2005/0071512 | A1* | 3/2005 | Kim | G07F 7/1008 710/1 |
| 2007/0121596 | A1* | 5/2007 | Kurapati | H04M 3/436 370/356 |
| 2007/0156919 | A1* | 7/2007 | Potti | H04L 63/12 709/238 |
| 2010/0274692 | A1* | 10/2010 | Hammad | G06Q 20/12 705/30 |
| 2012/0150748 | A1* | 6/2012 | Law | G06Q 20/40 705/71 |
| 2014/0358777 | A1* | 12/2014 | Gueh | G06Q 20/1085 705/43 |
| 2015/0127529 | A1* | 5/2015 | Makhotin | G06Q 20/322 705/39 |
| 2015/0149354 | A1* | 5/2015 | McCoy | G06F 3/167 705/42 |
| 2017/0091772 | A1* | 3/2017 | Piel | G06Q 20/36 |
| 2017/0155743 | A1* | 6/2017 | Sukhija | G06F 9/5027 |
| 2018/0053157 | A1* | 2/2018 | Roffey | G06K 19/06206 |
| 2019/0197533 | A1* | 6/2019 | Edwards | G06Q 20/3825 |
| 2020/0202342 | A1* | 6/2020 | Thomas | G06Q 20/4016 |

OTHER PUBLICATIONS

NFC Mobile Transactions and Authentication Based on GSM Network; 2010 Second International Workshop on Near Field Communication (pp. 83-89); Chen, W., Hancke, G.P., Mayes, K.E., Lien, Y., Chiu, J.-H., Apr. 1, 2010. (Year: 2010).*
Transactions I Declines—Braintree Support Articles, retrieved from https://articles. braintreepayments.com/control-panel/transactions/declines, pp. 1-21.

* cited by examiner

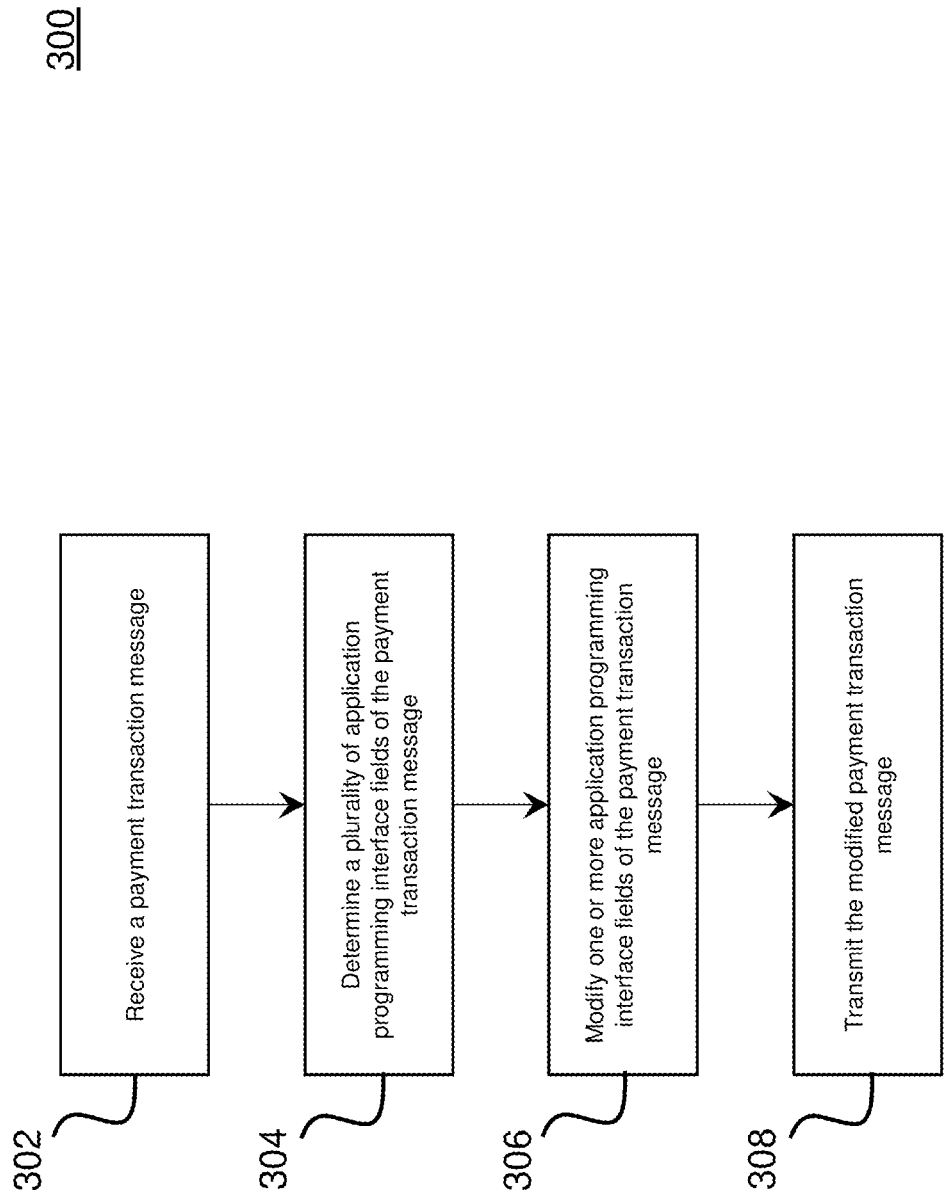

400

Second Payment Transaction Message

Application Programming Interface Fields:
Address Verification Field: "10 Jones | 94102"
Payment Installment Field: "3"
Transaction Value Field: "75.10 | USD"

First Payment Transaction Message

Application Programming Interface Fields:
Address Verification Field: "100 Smith | 94101"
Payment Installment Field: "5"
Transaction Value Field: "4.22 | USD"
Transaction Date: "20190403 | 14:22"

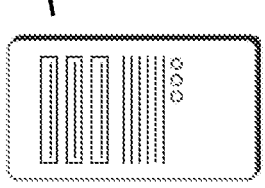

Payment Gateway System
406

Compare the plurality of application programming interface fields of the first payment transaction message to the plurality of application programming interface fields of the second payment transaction message
445

First Payment Transaction Message

Application Programming Interface Fields:
Address Verification Field: "100 Smith | 94101"
Payment Installment Field: "5"
Transaction Value Field: "4.22 | USD"
Transaction Date: "20190403 | 14:22"

Second Payment Transaction Message

Application Programming Interface Fields:
Address Verification Field: "10 Jones | 94102"
Payment Installment Field: "3"
Transaction Value Field: "75.10 | USD"
Transaction Date: "20190705 | 11:45"

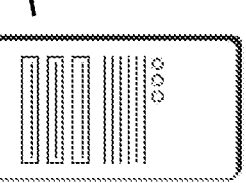

Payment Gateway System
406

Determining one or more application programming interface fields of the second payment transaction message to modify based on comparing the plurality of application programming interface fields of the first payment transaction to the plurality of application programming interface fields of the second payment transaction message
450

FIG. 4E

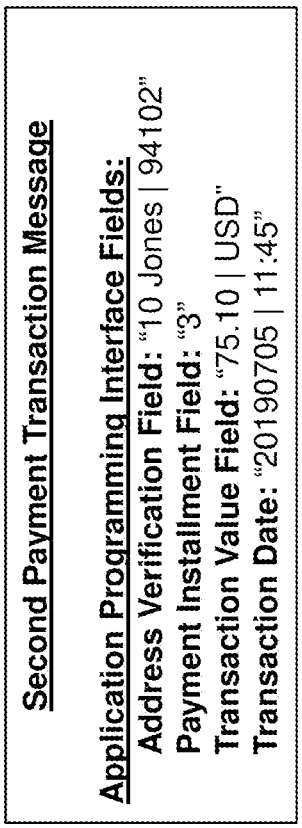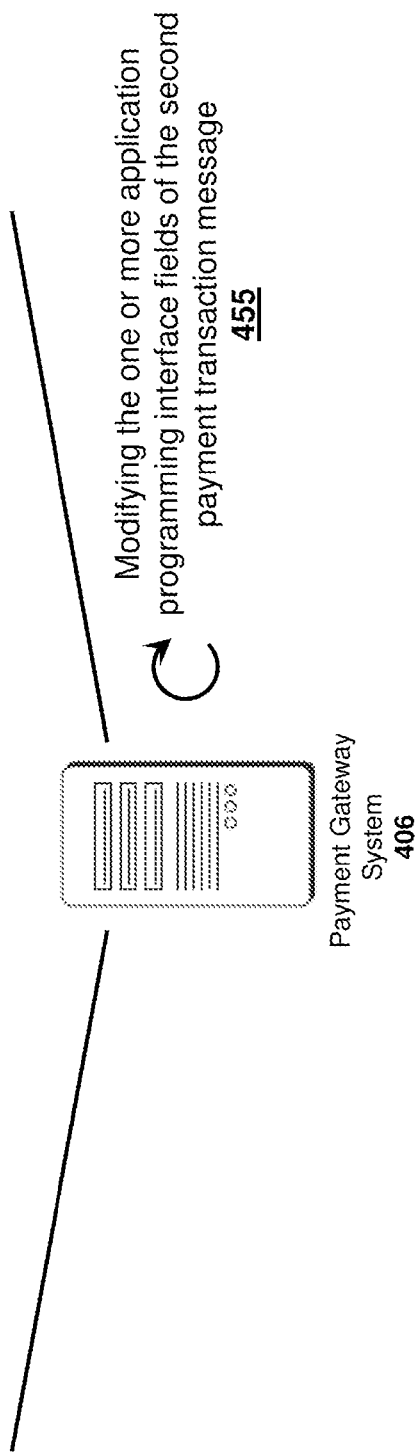
FIG. 4F

SYSTEM, METHOD, AND COMPUTER PROGRAM PRODUCT FOR UPDATING AN APPLICATION PROGRAMMING INTERFACE FIELD OF A TRANSACTION MESSAGE

CROSS REFERENCE TO RELATED APPLICATION

This application is a continuation application of U.S. patent application Ser. No. 16/711,530, filed Dec. 12, 2019, the disclosure of which is incorporated herein by reference in its entirety.

BACKGROUND

1. Field

This disclosure relates generally to transaction processing and, in some non-limiting embodiments or aspects, to systems, methods, and computer program products for updating an application programming interface (API) field of a payment transaction message.

2. Technical Considerations

After a payment transaction is initiated (e.g., at a point-of-sale (POS) terminal or an automated teller machine (ATM)), a message may be generated that is communicated across an electronic payment processing network. This message may conform to one or more message standards (e.g., International Organization for Standards (ISO) 8583 and/or the like). By conforming the message to the message standards, one or more systems that receive the message may accurately identify values associated with transaction parameters of the payment transaction and process the payment transaction. However, in some cases, systems may be configured to process messages generated in accordance with different standards. As a result, systems receiving messages that do not conform to a standard they are configured to process may forego processing such payment transactions. This, in turn, may result in additional communication between one or more systems included in the payment processing network as the payment transaction is re-initiated in an attempt to process the payment transaction. By virtue of this re-initiation, additional computing resources within the electronic payment processing network may need to be allocated and/or reserved for payment transactions that cannot be processed by virtue of their non-conformity with the standard by which the receiving system is configured to process messages associated with payment transactions. This, in turn, may lead to the unnecessary expense of computing resources and, in some cases, delaying subsequent payment transactions from being processed.

SUMMARY

Accordingly, disclosed are systems, methods, and computer program products for improving accuracy and efficiency of processing a payment transaction by updating an application programming interface (API) field when processing the payment transaction.

According to some non-limiting embodiments or aspects, provided is a computer-implemented method for updating an API field of a transaction message. The computer-implemented method may include receiving, with at least one processor, a payment transaction message, wherein the payment transaction message comprises data associated with a payment transaction; determining, with at least one processor, a plurality of API fields of the payment transaction message based on the data associated with the payment transaction; modifying, with at least one processor, one or more API fields of the payment transaction message; and transmitting, with at least one processor, a modified payment transaction message based on modifying the one or more API fields of the payment transaction message.

According to some non-limiting embodiments or aspects, provided is a system comprising at least one processor programmed or configured to: receive a payment transaction message, wherein the payment transaction message comprises data associated with a payment transaction; determine one or more API fields of the payment transaction message based on the data associated with the payment transaction; determine an API field requirement associated with the payment transaction message based on the data associated with the payment transaction; compare the API field requirement to the one or more API fields of the payment transaction message; determine the one or more API fields of the payment transaction message to be modified; modify one or more API fields of the payment transaction message based on determining the one or more API fields of the payment transaction to be modified; and transmit a modified payment transaction message based on modifying the one or more API fields of the payment transaction message.

According to some non-limiting embodiments or aspects, provided is a computer program product comprising at least one non-transitory computer-readable medium comprising one or more instructions that, when executed by at least one processor, cause the at least one processor to: receive a payment transaction message comprising data associated with a payment transaction, the payment transaction message associated with a route through an electronic payment processing network; determine one or more API fields of the payment transaction message based on the route through the electronic payment processing network; modify one or more API fields of the payment transaction message; and transmit a modified payment transaction message based on modifying the one or more API fields of the payment transaction message.

Further non-limiting aspects or embodiments are set forth in the following numbered clauses:

Clause 1: A method, comprising: receiving, with at least one processor, a payment transaction message, wherein the payment transaction message comprises data associated with a payment transaction; determining, with at least one processor, one or more application programming interface (API) fields of the payment transaction message based on the data associated with the payment transaction; modifying, with at least one processor, one or more API fields of the payment transaction message; and transmitting, with at least one processor, a modified payment transaction message based on modifying the one or more API fields of the payment transaction message.

Clause 2: The method of clause 1, further comprising: determining an API field requirement associated with the payment transaction message based on the data associated with the payment transaction; comparing the API field requirement to the one or more API fields of the payment transaction message; and determining the one or more API fields of the payment transaction message to be modified.

Clause 3: The method of clauses 1 or 2, wherein the payment transaction message is a first payment transaction message, and wherein determining the one or more API fields of the payment transaction message based on the data associated with the payment transaction comprises: determining a first one or more API fields of the first payment transaction message associated with a first route of the first payment transaction message through an electronic payment processing network; the method further comprising: determining a second one or more API fields of a second payment transaction message associated with a second route of the second payment transaction message through the electronic payment processing network; comparing the first one or more API fields of the first payment transaction message to the second one or more API fields of the second payment transaction message; determining the one or more API fields of the second payment transaction message to be modified based on comparing the one or more API fields of the second payment transaction message associated with the first route of the first payment transaction message through the electronic payment processing network with the one or more API fields of the payment transaction message; and transmitting a modified second payment transaction message on the first route through the electronic payment processing network based on modifying one or more API fields of the second payment transaction message.

Clause 4: The method of any of clauses 1-3, wherein modifying the one or more API fields of the payment transaction message comprises: modifying one or more merchant API fields of the one or more API fields of the payment transaction message, wherein the one or more merchant API fields are associated with a merchant that transmitted the payment transaction message; and wherein transmitting the modified payment transaction message comprises: transmitting the modified payment transaction message based on a route through an electronic payment processing network associated with the merchant.

Clause 5: The method of any of clauses 1-4, wherein the one or more API fields comprises at least one of: an address verification system (AVS) field; a payment installment field; or any combination thereof.

Clause 6: The method of any of clauses 1-5, further comprising: determining the one or more API fields of the payment transaction message to be modified based on an API field requirement associated with a merchant that transmitted the payment transaction message.

Clause 7: The method of any of clauses 1-6, wherein the payment transaction message comprises a payload, and wherein modifying the one or more API fields of the payment transaction message comprises: modifying the one or more API fields of the payment transaction message independent of modifying the payload of the payment transaction message.

Clause 8: A system, comprising: at least one processor programmed or configured to: receive a payment transaction message, wherein the payment transaction message comprises data associated with a payment transaction; determine one or more application programming interface (API) fields of the payment transaction message based on the data associated with the payment transaction; determine an API field requirement associated with the payment transaction message based on the data associated with the payment transaction; compare the API field requirement to the one or more API fields of the payment transaction message; determine the one or more API fields of the payment transaction message to be modified; modify one or more API fields of the payment transaction message based on determining the one or more API fields of the payment transaction to be modified; and transmit a modified payment transaction message based on modifying the one or more API fields of the payment transaction message.

Clause 9: The system of clause 8, wherein the payment transaction message is a first payment transaction message, and wherein, when determining the one or more API fields of the payment transaction message based on the data associated with the payment transaction, the at least one processor is programmed or configured to: determine a first one or more API fields of the first payment transaction message associated with a first route of the first payment transaction message through an electronic payment processing network; wherein the at least one processor is further programmed or configured to: determine a second one or more API fields of a second payment transaction message associated with a second route of the second payment transaction message through the electronic payment processing network; compare the first one or more API fields of the first payment transaction message to the second one or more API fields of the second payment transaction message; determine the one or more API fields of the second payment transaction message to be modified based on comparing the one or more API fields of the second payment transaction message associated with the first route of the first payment transaction message through the electronic payment processing network with the one or more API fields of the payment transaction message; and transmit a modified second payment transaction message on the first route through the electronic payment processing network based on modifying one or more API fields of the second payment transaction message.

Clause 10: The system of clauses 8 or 9, wherein, when modifying the one or more API fields of the payment transaction message, the at least one processor is programmed or configured to: modify one or more merchant API fields of the one or more API fields of the payment transaction message, wherein the one or more merchant API fields are associated with a merchant that transmitted the payment transaction message; and wherein, when transmitting the modified payment transaction message, the at least one processor is programmed or configured to: transmit the modified payment transaction message based on a route through an electronic payment processing network associated with the merchant.

Clause 11: The system of any of clauses 8-10, wherein the one or more API fields comprises at least one of: an address verification system (AVS) field; a payment installment field; or any combination thereof.

Clause 12: The system of any of clauses 8-11, wherein the at least one processor is further programmed or configured to: determine the one or more API fields of the payment transaction message to be modified based on an API field requirement associated with a merchant that transmitted the payment transaction message.

Clause 13: The system of any of clauses 8-12, wherein, when the payment transaction message comprises a payload, and when the at least one processor modifies the one or more API fields of the payment transaction message, the at least one processor is programmed or configured to: modify the one or more API fields of the payment transaction message independent of modifying the payload of the payment transaction message.

Clause 14: A computer program product comprising at least one non-transitory computer-readable medium comprising one or more instructions that, when executed by at least one processor, cause the at least one processor to: receive a payment transaction message comprising data associated with a payment transaction, the payment transaction message associated with a route through an electronic payment processing network; determine one or more application programming interface (API) fields of the payment transaction message based on the route through the electronic payment processing network; modify one or more API fields of the payment transaction message; and transmit a modified payment transaction message based on modifying the one or more API fields of the payment transaction message.

Clause 15: The computer program product of clause 14, wherein the one or more instructions further cause the at least one processor to: determine an API field requirement associated with the payment transaction message based on the data associated with the payment transaction; compare the API field requirement to the one or more API fields of the payment transaction message; and determine the one or more API fields of the payment transaction message to be modified.

Clause 16: The computer program product of clauses 14 or 15, wherein the payment transaction message is a first payment transaction message, and wherein, the one or more instructions further cause the at least one processor to: determine a second one or more API fields of a second payment transaction message associated with a second route of the second payment transaction message through the electronic payment processing network; compare the first one or more API fields of the first payment transaction message to the second one or more API fields of the second payment transaction message; determine the one or more API fields of the second payment transaction message to be modified based on comparing the one or more API fields of the second payment transaction message associated with the first route of the first payment transaction message through the electronic payment processing network with the one or more API fields of the payment transaction message; and transmit a modified second payment transaction message on the first route through the electronic payment processing network based on modifying one or more API fields of the second payment transaction message.

Clause 17: The computer program product of any of clauses 14-16, wherein, the one or more instructions that cause the at least one processor to modify the one or more API fields of the payment transaction message, cause the at least one processor to: modify one or more merchant API fields of the one or more API fields of the payment transaction message, wherein the one or more merchant API fields are associated with a merchant that transmitted the payment transaction message; and wherein, the one or more instructions that cause the at least one processor to transmit the modified payment transaction message cause the at least one processor to: transmit the modified payment transaction message based on a route through an electronic payment processing network associated with the merchant.

Clause 18: The computer program product of any of clauses 14-17, wherein the one or more API fields comprises at least one of: an address verification computer program product (AVS) field; a payment installment field; or any combination thereof.

Clause 19: The computer program product of any of clauses 14-18, wherein the one or more instructions further cause the at least one processor to: determine the one or more API fields of the payment transaction message to be modified based on an API field requirement associated with a merchant that transmitted the payment transaction message.

Clause 20: The computer program product of any of clauses 14-19, wherein, when the payment transaction message comprises a payload, and when the one or more instructions cause the at least one processor to modify the one or more API fields of the payment transaction message, the one or more instructions cause the at least one processor to: modify the one or more API fields of the payment transaction message independent of modifying the payload of the payment transaction message.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

FIG. 3 is a flowchart of a non-limiting embodiment or aspect of a process for updating an API field of a transaction message; and FIGS. 4A-4G are diagrams of an implementation of a non-limiting embodiment or aspect of a process for updating an API field of a transaction message.

DESCRIPTION

Figure 1:
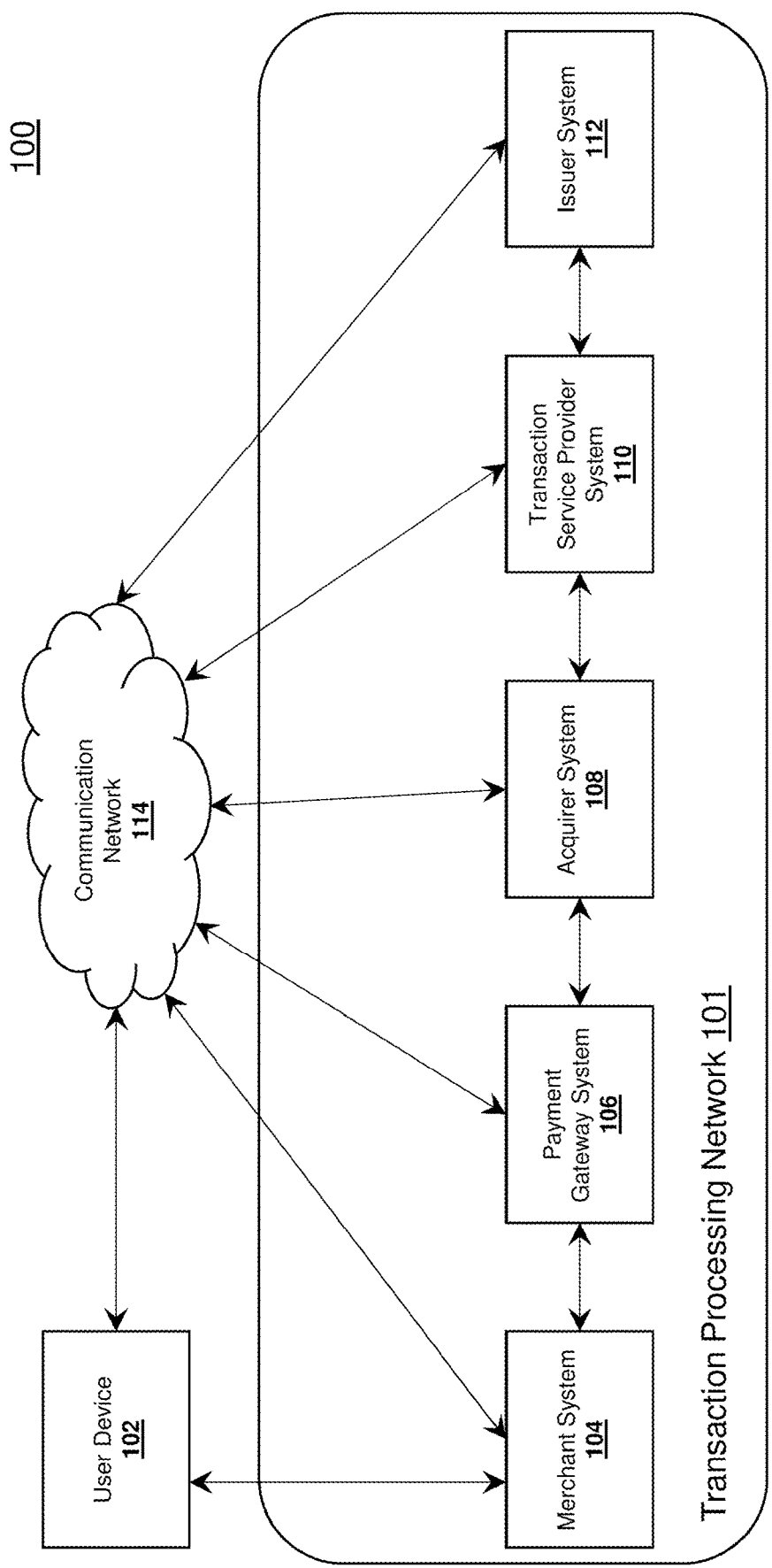
FIG. 1 is a diagram of a non-limiting embodiment or aspect of an example environment for updating an application programming interface (API) field of a transaction message.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. In addition, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some non-limiting embodiments or aspects, a message may refer to a network packet (e.g., a data packet and/or the like) that includes data.

As used herein, the terms "issuer," "issuer institution," "issuer bank," or "payment device issuer," may refer to one or more entities that provide accounts to individuals (e.g., users, customers, and/or the like) for conducting payment transactions, such as credit payment transactions and/or debit payment transactions. For example, an issuer institution may provide an account identifier, such as a primary account number (PAN), to a customer that uniquely identifies one or more accounts associated with that customer. In some non-limiting embodiments or aspects, an issuer may be associated with a bank identification number (BIN) that uniquely identifies the issuer institution. As used herein, the term "issuer system" may refer to one or more computer systems operated by or on behalf of an issuer, such as a server executing one or more software applications. For example, an issuer system may include one or more authorization servers for authorizing a transaction.

As used herein, the term "account identifier" may refer to one or more types of identifiers associated with an account (e.g., a PAN associated with an account, a card number associated with an account, a payment card number associated with an account, a token associated with an account, and/or the like). In some non-limiting embodiments or aspects, an issuer may provide an account identifier (e.g., a PAN, a token, and/or the like) to a user (e.g., an accountholder) that uniquely identifies one or more accounts associated with that user. The account identifier may be embodied on a payment device (e.g., a physical instrument used for conducting payment transactions, such as a payment card, a credit card, a debit card, a gift card, and/or the like) and/or may be electronic information communicated to the user that the user may use for electronic payment transactions. In some non-limiting embodiments or aspects, the account identifier may be an original account identifier, where the original account identifier was provided to a user at the creation of the account associated with the account identifier. In some non-limiting embodiments or aspects, the account identifier may be a supplemental account identifier, which may include an account identifier that is provided to a user after the original account identifier was provided to the user. For example, if the original account identifier is forgotten, stolen, and/or the like, a supplemental account identifier may be provided to the user. In some non-limiting embodiments or aspects, an account identifier may be directly or indirectly associated with an issuer institution such that an account identifier may be a token that maps to a PAN or other type of account identifier. Account identifiers may be alphanumeric, any combination of characters and/or symbols, and/or the like.

As used herein, the term "token" may refer to an account identifier that is used as a substitute or replacement for another account identifier, such as a PAN. Tokens may be associated with a PAN or other original account identifier in one or more data structures (e.g., one or more databases and/or the like) such that they may be used to conduct a payment transaction without directly using the original account identifier. In some non-limiting embodiments or aspects, an original account identifier, such as a PAN, may be associated with a plurality of tokens for different individuals or purposes. In some non-limiting embodiments or aspects, tokens may be associated with a PAN or other account identifiers in one or more data structures such that they can be used to conduct a transaction without directly using the PAN or the other account identifiers. In some examples, an account identifier, such as a PAN, may be associated with a plurality of tokens for different uses or different purposes.

As used herein, the term "merchant" may refer to one or more entities (e.g., operators of retail businesses) that provide goods and/or services, and/or access to goods and/or services, to a user (e.g., a customer, a consumer, and/or the like) based on a transaction, such as a payment transaction. As used herein, the term "merchant system" may refer to one or more computer systems operated by or on behalf of a merchant, such as a server executing one or more software applications. As used herein, the term "product" may refer to one or more goods and/or services offered by a merchant.

As used herein, the term "point-of-sale (POS) device" may refer to one or more devices, which may be used by a merchant to conduct a transaction (e.g., a payment transaction) and/or process a transaction. For example, a POS device may include one or more client devices. Additionally or alternatively, a POS device may include peripheral devices, card readers, scanning devices (e.g., code scanners), BLUETOOTH® communication receivers, near-field communication (NFC) receivers, radio frequency identification (RFID) receivers, and/or other contactless transceivers or receivers, contact-based receivers, payment terminals, and/or the like.

As used herein, the term "point-of-sale (POS) system" may refer to one or more client devices and/or peripheral devices used by a merchant to conduct a transaction. For example, a POS system may include one or more POS devices and/or other like devices that may be used to conduct a payment transaction. In some non-limiting embodiments or aspects, a POS system (e.g., a merchant POS system) may include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as VISA®, MASTERCARD®, AMERICAN EXPRESS®, or any other entity that processes transactions. As used herein, the term "transaction service provider system" may refer to one or more computer systems operated by or on behalf of a transaction service provider, such as a transaction service provider system executing one or more software applications. A transaction service provider system may include one or more processors and, in some non-limiting embodiments or aspects, may be operated by or on behalf of a transaction service provider.

As used herein, the term "acquirer" may refer to an entity licensed by the transaction service provider and approved by the transaction service provider to originate transactions (e.g., payment transactions) involving a payment device associated with the transaction service provider. As used herein, the term "acquirer system" may also refer to one or more computer systems, computer devices, and/or the like operated by or on behalf of an acquirer. The transactions the acquirer may originate may include payment transactions (e.g., purchases, original credit transactions (OCTs), account funding transactions (AFTs), and/or the like). In some non-limiting embodiments or aspects, the acquirer may be authorized by the transaction service provider to assign merchant or service providers to originate transactions involving a payment device associated with the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by the acquirer's payment facilitators, and/or the like. In some non-limiting embodiments or aspects, an acquirer may be a financial institution, such as a bank.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway.

As used herein, the terms "electronic wallet," "electronic wallet mobile application," and "digital wallet" may refer to one or more electronic devices including one or more software applications configured to facilitate and/or conduct transactions (e.g., payment transactions, electronic payment transactions, and/or the like). For example, an electronic wallet may include a user device (e.g., a mobile device) executing an application program, server-side software, and/or databases for maintaining and providing data to be used during a payment transaction to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, GOOGLE PAY®, ANDROID PAY®, APPLE PAY®, and SAMSUNG PAY®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the term "payment device" may refer to a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, and/or the like. The payment device may include a volatile or a non-volatile memory to store information (e.g., an account identifier, a name of the account holder, and/or the like).

As used herein, the terms "client" and "client device" may refer to one or more computing devices, such as processors, storage devices, and/or similar computer components, that access a service made available by a server. In some non-limiting embodiments or aspects, a "client device" may refer to one or more devices that facilitate payment transactions, such as POS devices and/or POS systems used by a merchant. In some non-limiting embodiments or aspects, a client device may include an electronic device configured to communicate with one or more networks and/or facilitate payment transactions such as, but not limited to, one or more desktop computers, one or more portable computers (e.g., tablet computers), one or more mobile devices (e.g., cellular phones, smartphones, PDAs, wearable devices, such as watches, glasses, lenses, and/or clothing, and/or the like), and/or other like devices. Moreover, a "client" may also refer to an entity, such as a merchant, that owns, utilizes, and/or operates a client device for facilitating payment transactions with a transaction service provider.

As used herein, the term "server" may refer to one or more computing devices, such as processors, storage devices, and/or similar computer components that communicate with client devices and/or other computing devices over a network, such as, the Internet or private networks and, in some examples, facilitate communication among other servers and/or client devices.

As used herein, the term "system" may refer to one or more computing devices or combinations of computing devices such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Provided are improved systems, methods, and computer program products for updating an API field of a transaction message. In some non-limiting embodiments or aspects, methods may include receiving, with at least one processor, a payment transaction message, wherein the payment transaction message comprises data associated with a payment transaction; determining, with at least one processor, one or more API fields of the payment transaction message based on the data associated with the payment transaction; modifying, with at least one processor, one or more API fields of the payment transaction message; and transmitting, with at least one processor, a modified payment transaction message based on modifying the one or more API fields of the payment transaction message.

By virtue of implementation of the systems, methods, and computer program products described herein, systems may be developed and/or implemented that enable systems to modify messages associated with payment transactions to enable systems (e.g., issuer systems) receiving the messages to successfully process the payment transactions (e.g., determine whether to authorize or forego authorizing the payment transactions). By virtue of the features disclosed by the present disclosure, additional computing resources within the electronic payment processing network may not need to be allocated and/or reserved for payment transactions that cannot be processed by virtue of their non-conformity with the standard by which the receiving system is configured to process messages associated with payment transactions. This, in turn, may lead to the conservation of computing resources and in some cases the expedition of subsequent payment transactions to be processed as well an increase in the accuracy by which payment transaction are processed.

Referring now to FIG. 1, FIG. 1 is a diagram of a non-limiting embodiment of an example environment 100 in which devices, systems, methods, and/or products described herein may be implemented. As shown in FIG. 1, environment 100 includes transaction processing network 101, user device 102, merchant system 104, payment gateway system 106, acquirer system 108, transaction service provider system 110, and/or issuer system 112. Transaction processing network 101, user device 102, merchant system 104, payment gateway system 106, acquirer system 108, transaction service provider system 110, and/or issuer system 112 may interconnect (e.g., establish a connection to communicate and/or the like) via wired connections, wireless connections, or a combination of wired and wireless connections.

User device 102 may include one or more devices configured to be in communication with merchant system 104, payment gateway system 106, acquirer system 108, transaction service provider system 110, and/or issuer system 112 via communication network 114 and/or other networks. For example, user device 102 may include a client device and/or the like. User device 102 may be configured to transmit and/or receive data to and/or from merchant system 104 via an imaging system and/or a short-range wireless communication connection (e.g., an NFC communication connection, an RFID communication connection, a BLUETOOTH® communication connection, and/or the like). In some non-limiting embodiments or aspects, user device 102 may be associated with a user (e.g., an individual operating a device). In some non-limiting embodiments or aspects, user device 102 may include an application associated with user device 102 (e.g., an application stored on user device 102 such as a mobile device application, a native application for a mobile device, a mobile cloud application for a mobile device, an electronic wallet application, a peer-to-peer payment transfer application, and/or the like).

Merchant system 104 may include one or more devices configured to be in communication with user device 102, payment gateway system 106, acquirer system 108, transaction service provider system 110, and/or issuer system 112 via communication network 114 and/or other networks. For example, merchant system 104 may include one or more computing devices configured to transmit and/or receive data to and/or from user device 102, payment gateway system 106, acquirer system 108, transaction service provider system 110, and/or issuer system 112 via communication network 114 and/or other networks, such as a server, a group of servers, a client device, a group of client devices, and/or other like devices. In some non-limiting embodiments or aspects, merchant system 104 may include a point-of-sale (POS) device. In some non-limiting embodiments or aspects, merchant system 104 may be associated with a merchant as described herein. In some non-limiting embodiments or aspects, merchant system 104 may include an application associated with merchant system 104 (e.g., an application stored on merchant system 104 such as an application, a native application, a cloud application, a mobile device application, a native application for a mobile device, a mobile cloud application for a mobile device, an electronic wallet application, a peer-to-peer payment transfer application, and/or the like).

Payment gateway system 106 may include one or more devices configured to be in communication with user device 102, merchant system 104, acquirer system 108, transaction service provider system 110, and/or issuer system 112 via communication network 114 and/or other networks. For example, payment gateway system 106 may include a server, a group of servers, and/or other like devices. In some non-limiting embodiments or aspects, payment gateway system 106 may be associated with a payment gateway as described herein.

Acquirer system 108 may include one or more devices configured to be in communication with user device 102, merchant system 104, payment gateway system 106, transaction service provider system 110, and/or issuer system 112 via communication network 114 and/or other networks. For example, acquirer system 108 may include a server, a group of servers, and/or other like devices. In some non-limiting embodiments or aspects, acquirer system 108 may be associated with an acquirer as described herein.

Transaction service provider system 110 may include one or more devices configured to be in communication with user device 102, merchant system 104, payment gateway system 106, acquirer system 108, and/or issuer system 112 via communication network 114 and/or other networks. For example, transaction service provider system 110 may include a server (e.g., a transaction processing server), a group of servers, and/or other like devices. In some non-limiting embodiments or aspects, transaction service provider system 110 may be associated with a transaction service provider as described herein.

Issuer system 112 may include one or more devices configured to be in communication with user device 102, merchant system 104, payment gateway system 106, acquirer system 108, and/or transaction service provider system 110 via communication network 114 and/or other networks. For example, issuer system 112 may include a server, a group of servers, and/or other like devices. In some non-limiting embodiments or aspects, issuer system 112 may be associated with an issuer institution that issued a payment account and/or instrument (e.g., a credit account, a debit account, a credit card, a debit card, and/or the like) to a user (e.g., a user associated with user device 102 and/or the like).

In some non-limiting embodiments or aspects, transaction processing network 101 includes a plurality of systems in a communication path for processing a transaction. For example, transaction processing network 101 may include merchant system 104, payment gateway system 106, acquirer system 108, transaction service provider system 110, and/or issuer system 112 in a communication path (e.g., a communication path, a communication channel, a communication network, and/or the like). As an example, transaction processing network 101 may process (e.g., initiate, conduct, authorize, and/or the like) an electronic payment transaction via the communication path between merchant system 104, payment gateway system 106, acquirer system 108, transaction service provider system 110, and/or issuer system 112.

Communication network 114 may include one or more wired and/or wireless networks. For example, communication network 114 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of some or all of these or other types of networks.

The number and arrangement of systems and/or devices shown in FIG. 1 are provided as an example. There may be additional systems and/or devices, fewer systems and/or devices, different systems and/or devices, or differently arranged systems and/or devices than those shown in FIG. 1. Furthermore, two or more systems and/or devices shown in FIG. 1 may be implemented within a single system or a single device, or a single system or a single device shown in FIG. 1 may be implemented as multiple, distributed systems or devices. Additionally or alternatively, a set of systems or a set of devices (e.g., one or more systems, one or more devices) of environment 100 may perform one or more functions described as being performed by another set of systems or another set of devices of environment 100.

Figure 2:
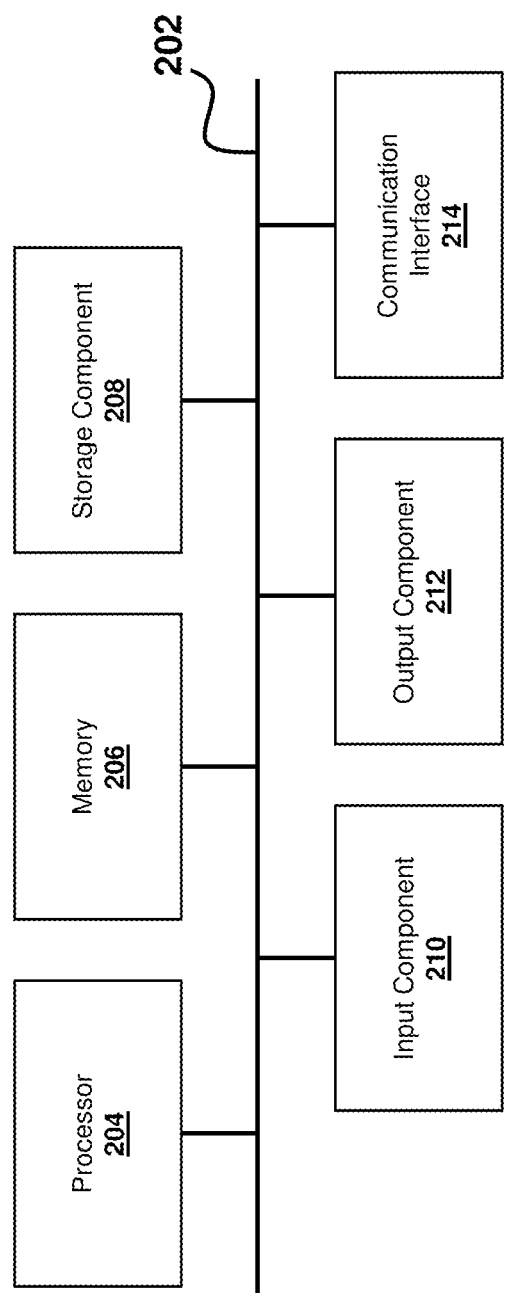
FIG. 2 is a diagram of a non-limiting embodiment or aspect of components of one or more devices and/or one or more systems of FIG. 1.

Referring now to FIG. 2, FIG. 2 is a diagram of example components of device 200. Device 200 may correspond to one or more devices of transaction processing network 101, one or more devices of user device 102 (e.g., one or more devices of a system of user device 102), one or more devices of merchant system 104, one or more devices of payment gateway system 106, one or more devices of acquirer system 108, one or more devices of transaction service provider system 110, one or more devices of issuer system 112, and/or one or more devices of communication network 114. In some non-limiting embodiments or aspects, one or more devices of user device 102, one or more devices of merchant system 104, one or more devices of payment gateway system 106, one or more devices of acquirer system 108, one or more devices of transaction service provider system 110, one or more devices of issuer system 112, and/or one or more devices of communication network 114 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touchscreen display, a keyboard, a keypad, a mouse, a button, a switch, a microphone, a camera, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a WI-FI® interface, a BLUETOOTH® interface, a ZIGBEE® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database, and/or the like). Device 200 may be capable of receiving information from, storing information in, communicating information to, or searching information stored in the data storage or one or more data structures in memory 206 and/or storage component 208. For example, the information may include clearing record data, input data, output data, transaction data, account data, or any combination thereof.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Referring now to FIG. 3, FIG. 3 is a flowchart of a non-limiting aspect or embodiment of process 300 for updating an API field of a transaction message. In some non-limiting embodiments or aspects, one or more of the functions described with respect to process 300 may be performed (e.g., completely, partially, etc.) by transaction service provider system 110. In some non-limiting embodiments or aspects, one or more of the steps of process 300 may be performed (e.g., completely, partially, and/or the like) by another device or a group of devices separate from and/or including transaction service provider system 110, such as user device 102, merchant system 104, payment gateway system 106, acquirer system 108, and/or issuer system 112.

As shown in FIG. 3, at step 302, process 300 may include receiving a payment transaction message. For example, payment gateway system 106 may receive a payment transaction message including data associated with a payment transaction involving a user associated with user device 102 and a merchant associated with merchant system 104. In some non-limiting embodiments or aspects, payment gateway system 106 may receive the payment transaction message from acquirer system 108 based on acquirer system 108 receiving data associated with a payment transaction. For example, acquirer system 108 may transmit the payment transaction message including the data associated with the payment transaction to payment gateway system 106 based on acquirer system 108 receiving the data associated with the payment transaction from merchant system 104. In such an example, acquirer system 108 may generate the payment transaction message. In another example, acquirer system 108 may transmit the payment transaction message including the data associated with the payment transaction to payment gateway system 106 based on (e.g., in response to and/or after) acquirer system 108 receiving the payment transaction message from merchant system 104. In such an example, merchant system 104 may generate the payment transaction message based on merchant system 104 determining the data associated with the payment transaction.

In some non-limiting embodiments or aspects, acquirer system 108 may generate the payment transaction message based on data associated with the payment transaction that acquirer system 108 received from merchant system 104. For example, acquirer system 108 may generate the payment transaction message based on data associated with the payment transaction and a messaging standard (e.g., a template for generating transaction messages, the template defining one or more API fields). In some non-limiting embodiments or aspects, the messaging standard may be associated with the acquirer system 108. In another example, the message standard may be associated with payment gateway system 106 and/or issuer system 112.

As shown in FIG. 3, at step 304, process 300 may include determining a plurality of application programming interface (API) fields of the payment transaction message. For example, payment gateway system 106 may determine one or more API fields of a payment transaction message based on the data associated with the payment transaction included in the payment transaction message. In such an example, payment gateway system 106 may determine the one or more API fields of the payment transaction message based on acquirer system 108 from which payment gateway system 106 received the payment transaction message. In another example, payment gateway system 106 may determine the one or more API fields of the payment transaction message based on issuer system 112 to which the payment transaction message is addressed. In some non-limiting embodiments or aspects, payment gateway system 106 may determine the one or more API fields of the payment transaction message based on receiving the payment transaction message. For example, payment gateway system 106 may determine the one or more API fields of the payment transaction message based on payment gateway system 106 receiving the payment transaction message from acquirer system 108.

In some non-limiting embodiments or aspects, payment gateway system 106 may determine the one or more API fields of the payment transaction message based on payment gateway system 106 determining that the payment transaction message is associated with a route through an electronic payment processing network. For example, payment gateway system 106 may determine the payment transaction message is associated with the route through the electronic payment processing network based on payment gateway system 106 determining that user device 102 and/or merchant system 104 are involved in the payment transaction. Additionally or alternatively, payment gateway system 106 may determine that the payment transaction message is associated with the route through the electronic payment processing network based on determining that issuer system 112 is involved in the payment transaction. For example, payment gateway system 106 may determine that issuer system 112 is involved in the payment transaction based on payment gateway system 106 determining that a payment account associated with user device 102 (e.g., issued to the user associated with user device 102) is associated with issuer system 112.

In some non-limiting embodiments or aspects, one or more of API fields of the one or more API fields of the payment transaction message may be associated with one or more of an address verification system (AVS) field, a payment installment field, an API field associated with a custom code of one or more systems associated with a route through the electronic payment processing network, and/or other like fields. For example, a first API field of the one or more API fields of the payment transaction message may be an AVS field that corresponds to data associated with an address involved in the payment transaction (e.g., an address associated with user device 102 and/or merchant system 104). In another example, a second API field of the one or more API fields of the payment transaction message may be a payment installment field that corresponds to data associated with a payment installment type (e.g., instructions to transfer funds from an account maintained by issuer system 112 to acquirer system 108 within a predetermined period of time, immediately, and/or the like.

In some non-limiting embodiments or aspects, payment gateway system 106 may determine an API field requirement associated with the payment transaction message. For example, payment gateway system 106 may determine an API field requirement associated with the payment transaction message based on the data associated with the payment transaction included in the payment transaction message. The API field requirement may include, for example, one or more API fields that must be included in a payment transaction message to successfully process the payment transaction message when transmitted along a route through an electronic payment processing network. Additionally or alternatively, payment gateway system 106 may determine the API field requirement associated with the payment transaction message based on one or more previously-processed payment transaction messages. For example, payment gateway system 106 may determine the API field requirement associated with the payment transaction message based on one or more previously-processed payment transaction messages. In such an example, payment gateway system 106 may determine the API field requirement associated with the payment transaction message based on one or more previously-processed payment transaction messages where payment gateway system 106 determines that the route through the electronic payment processing network associated with the one or more previously-processed payment transaction messages is associated with (e.g., is partially and/or completely the same as) the route through the electronic payment processing network associated with the payment transaction message. In some non-limiting embodiments or aspects, payment gateway system 106 may determine the API field requirement associated with the payment transaction message based on payment gateway system 106 determining that the one or more previously-processed payment transaction messages are associated with payment transactions that were successfully processed.

In some non-limiting embodiments or aspects, payment gateway system 106 may compare the API field requirement to the one or more API fields of the payment transaction message. For example, payment gateway system 106 may compare the API field requirement to the one or more API fields of the payment transaction message based on payment gateway system 106 determining the API field requirement associated with the payment transaction message. In some non-limiting embodiments or aspects, payment gateway system 106 may determine one or more of the API fields of the payment transaction message to be modified. For example, payment gateway system 106 may determine that one or more of the API fields of the payment transaction message to be modified based on the API field requirement. In such an example, payment gateway system 106 may compare the one or more API fields of the payment transaction message to the API field requirement and payment gateway system 106 may determine the one or more API fields of the payment transaction message to be modified based on the comparison of the one or more API fields of the payment transaction message to the API field requirement.

In some non-limiting embodiments or aspects, payment gateway system 106 may determine one or more API fields of the payment transaction message to be modified based on an API field requirement associated with a merchant involved in the payment transaction. For example, payment gateway system 106 may determine the one or more API fields of the payment transaction message to be modified based on one or more previously-processed payment transaction messages associated with the merchant. In such an example, payment gateway system 106 may determine the API field requirements associated with the one or more previously-processed payment transaction messages associated with the merchant and payment gateway system 106 may determine one or more API fields of the payment transaction message to be modified based on the API field requirements associated with the one or more previously-processed payment transaction messages.

In some non-limiting embodiments or aspects, payment gateway system 106 may determine one or more API fields of a second payment transaction message. For example, payment gateway system 106 may determine one or more API fields of a second payment transaction message that was previously-received by payment gateway system 106 and/or previously-processed (e.g., received by payment gateway system 106 and transmitted to issuer system 112) by payment gateway system 106. In such an example, the second payment transaction message may be associated with a route through the electronic payment processing network. In some non-limiting embodiments or aspects, the route through the electronic payment processing network associated with the second payment transaction message may be the same as or different to the route through the electronic payment processing network that is associated with the payment transaction message.

In some non-limiting embodiments or aspects, payment gateway system 106 may compare the one or more API fields of the second payment transaction message to the one or more API fields of the payment transaction message. For example, payment gateway system 106 may compare the one or more API fields of the second payment transaction message to the one or more API fields of the payment transaction message based on payment gateway system 106 determining that the second payment transaction message and the payment transaction message are associated with one another (e.g., that the second payment transaction message and the payment transaction message are both associated with the same route through the electronic payment processing network, that the second payment transaction message and the payment transaction message are both associated with merchant system 104, that the second payment transaction message and the payment transaction message are associated with issuer system 112, and/or the like).

In some non-limiting embodiments or aspects, payment gateway system 106 may determine one or more API fields of the payment transaction message to be modified based on comparing the one or more API fields of the second payment transaction message to the one or more API fields of the payment transaction message. For example, payment gateway system 106 may determine that the one or more API fields are included in the second payment transaction message that are not included in the payment transaction message. Payment gateway system 106 may then determine that the one or more API fields that are included in the second payment transaction message are to be included in the API fields of the payment transaction message. In another example, payment gateway system 106 may determine that the one or more API fields of the payment transaction message are not included in the one or more API fields of the second payment transaction message. Payment gateway system 106 may then determine that the one or more fields included in the payment transaction message that are not included in the second payment transaction message are not to be included in the one or more API fields of the payment transaction message.

As shown in FIG. 3, at step 306, process 300 may include modifying one or more application programming interface (API) fields of the payment transaction message. For example, payment gateway system 106 may modify one or more API fields of the payment transaction message. In such an example, payment gateway system 106 may modify the one or more API fields of the payment transaction message based on payment gateway system 106 determining the one or more API fields of the payment transaction message to be modified.

In some non-limiting embodiments or aspects, payment gateway system 106 may modify one or more API fields of a payment transaction message based on payment gateway system 106 determining that one or more API fields of the payment transaction message are merchant API fields that are associated with a merchant. For example, payment gateway system 106 may modify the one or more API fields of a payment transaction message based on payment gateway system 106 determining that the one or more API fields of the payment transaction message are merchant API fields associated with a merchant. In such an example, the merchant API fields may correspond to data associated with the payment transaction and/or data generated by merchant system 104 that is associated with the payment transaction. In some non-limiting embodiments or aspects, payment gateway system 106 may generate a modified payment transaction message based on modifying the one or more API fields of the payment transaction message.

In some non-limiting embodiments or aspects, payment gateway system 106 may modify one or more API fields of the payment transaction message by payment gateway system 106 including one or more API fields in the payment transaction message. For example, payment gateway system 106 may modify one or more API fields of the payment transaction message by payment gateway system 106 including one or more API fields in the payment transaction message, the one or more API fields including default values (e.g., default values for a payment transaction). In an example, payment gateway system 106 may modify one or more API fields of the payment transaction message by payment gateway system 106 including one or more API fields in the payment transaction message, the one or more API fields including values generated by payment gateway system 106 based on the data associated with the payment transaction. In some non-limiting embodiments or aspects, payment gateway system 106 may modify the one or more API fields of the payment transaction message based on one or more trends and/or the date on which the payment transaction was initiated. For example, payment gateway system 106 may modify the one or more API fields of the payment transaction message based on a trend that one or more parameters of the payment transactions be included in payment transaction messages when processing the payment transactions. In another example, payment gateway system 106 may modify the one or more API fields of the payment transaction message based on the date where one or more API fields are requested during a particular date or range of dates (e.g., one or more API fields may be requested during a period of time associated with a holiday and/or the like).

In some non-limiting embodiments or aspects, payment gateway system 106 may modify the one or more API fields of the payment transaction message independent of modifying a payload of the payment transaction message (e.g., data included in the payment transaction message such as the data associated with the payment transaction and/or other data included in the payment transaction message). For example, payment gateway system 106 may modify the one or more API fields of the payment transaction message and payment gateway system 106 may modify the payload of the payment transaction message based on modifying the one or more API fields of the payment transaction message. In another example, payment gateway system 106 may modify the payload of the payment transaction message before modifying the one or more API fields of the payment transaction message. In an example, payment gateway system 106 may modify the one or more API fields of the payment transaction message and payment gateway system 106 may forego modifying the payload of the payment transaction message.

As shown in FIG. 3, at step 308, process 300 may include transmitting the modified payment transaction message. For example, payment gateway system 106 may transmit the modified payment transaction message to issuer system 112. In such an example, payment gateway system 106 may transmit the modified payment transaction message based on payment gateway system 106 modifying the one or more API fields of the payment transaction message. Payment gateway system 106 may transmit the modified payment transaction message to issuer system 112 along a route through the electronic payment processing network. In some non-limiting embodiments or aspects, the route through the electronic payment processing network may be the same as the route associated with the payment transaction message. Additionally or alternatively, payment gateway system 106 may transmit the modified payment transaction message along a route that is different from the route associated with the payment transaction message (e.g., a route associated with a previously-processed payment transaction message, a route associated with merchant system 104 involved in the payment transaction, a route associated with the issuer system 112 involved in the payment transaction, and/or the like).

FIGS. 4A-4G are an overview of a non-limiting embodiment or aspect of an implementation 400 for updating an API field of a transaction message. As shown in FIGS. 4A-4G, implementation 400 may include payment gateway system 406, acquirer system 408, issuer system 412, and payment processing node 416. In some non-limiting embodiments or aspects, payment gateway system 406 may be the same or similar to payment gateway system 106. In some non-limiting embodiments or aspects, acquirer system 408 may be the same or similar to acquirer system 108. In some non-limiting embodiments or aspects, issuer system 412 may be the same as or similar to issuer system 112.

Payment processing node 416 may include one or more computing devices configured to be in communication with payment gateway system 406, acquirer system 408, and/or issuer system 412 via a communication network (e.g., communication network 114 and/or a communication network that is the same as or similar to communication network 114). For example, payment processing node 416 may include a server, a group of servers, and/or other like devices. In some non-limiting embodiments or aspects, payment processing node 416 may be associated with a payment gateway, a transaction service provider, a merchant, an acquirer, an issuer, and/or the like as described herein.

Figure 4A:
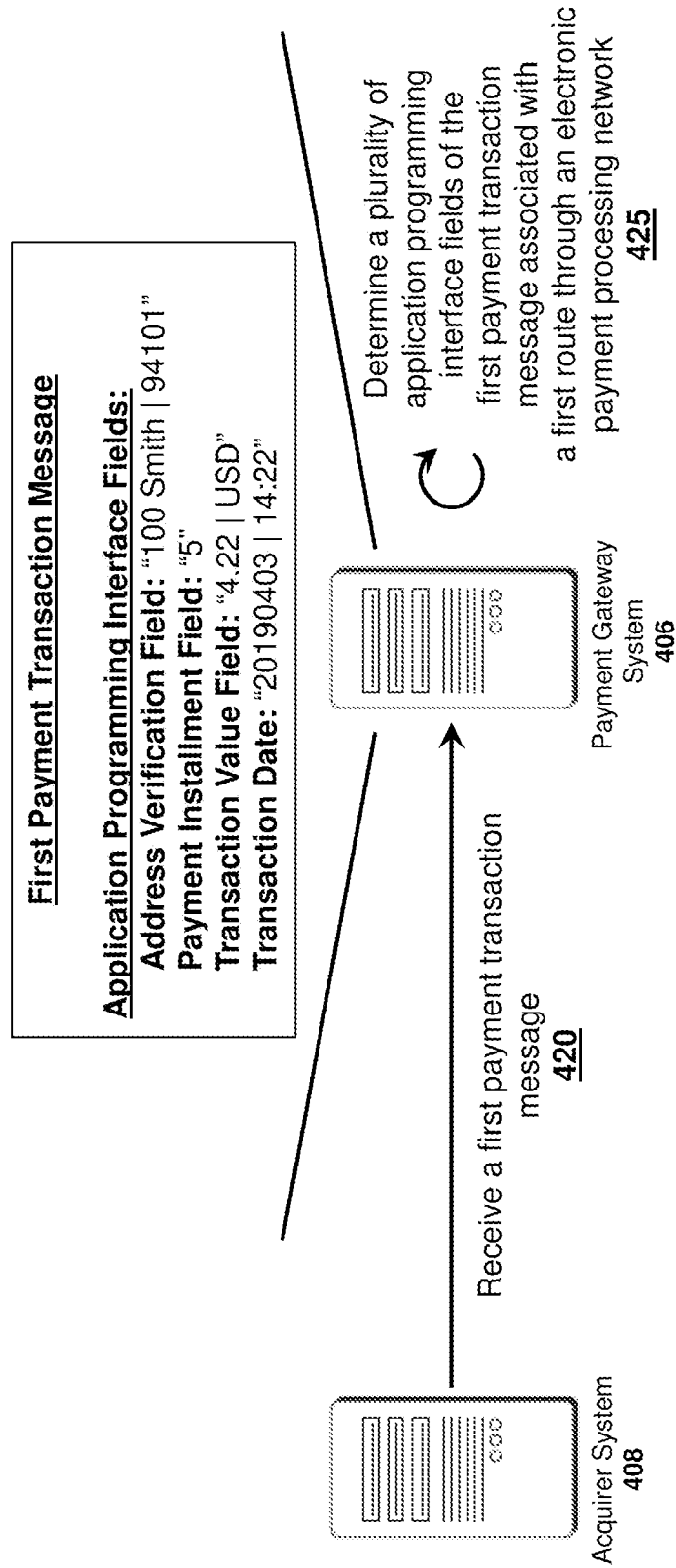

As shown by reference number 420 in FIG. 4A, payment gateway system 406 may receive a first payment transaction message from acquirer system 408. For example, payment gateway system 406 may receive the first payment transaction message from acquirer system 408 based on acquirer system 408 receiving data associated with a payment transaction. In such an example, payment gateway system 406 may receive the first payment transaction message from acquirer system 408 based on acquirer system 408 receiving data associated with a payment transaction from a merchant system (e.g., merchant system 104) after the merchant system communicates with a user device (e.g., user device 102) to initiate the payment transaction.

As shown by reference number 425 in FIG. 4A, payment gateway system 406 may determine a plurality of API fields. For example, payment gateway system 406 may determine a plurality of API fields of the first payment transaction message. In such an example, payment gateway system 406 may determine the plurality of API fields of the first payment transaction message where the first payment transaction message is associated with a first route through an electronic payment processing network.

Figure 4B:
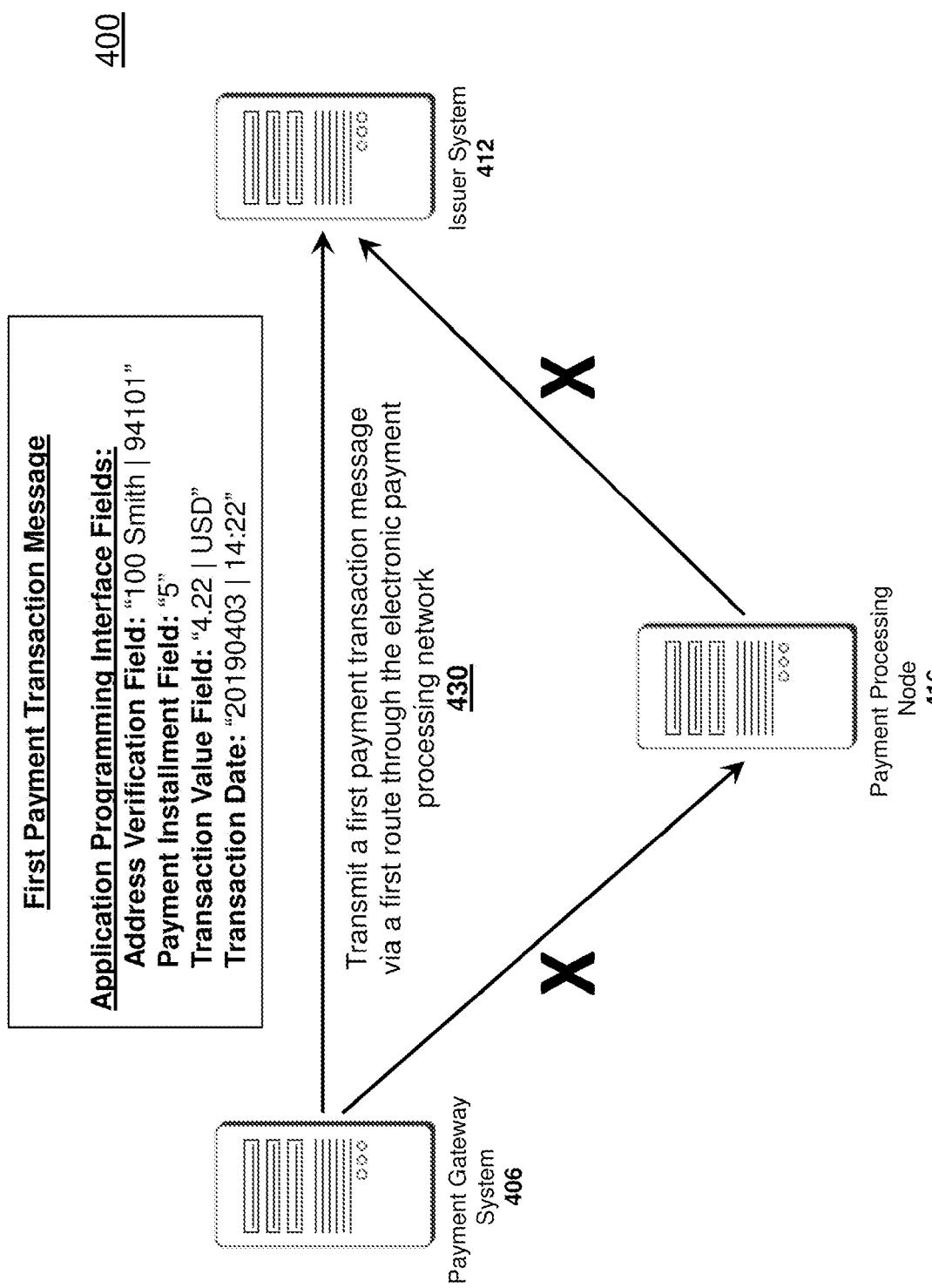

As shown by reference number 430 in FIG. 4B, payment gateway system 406 may transmit a first payment transaction message to issuer system 412. For example, payment gateway system 406 may transmit a first payment transaction message to issuer system 412 via a first route through the electronic payment processing network (e.g., from payment gateway system 406 to issuer system 412). In such an example, payment gateway system 406 may forego transmitting the first payment transaction message to issuer system 412 via a different route (e.g., a second route from payment gateway system 406 to issuer system 412 via payment processing node 416).

Figure 4C:
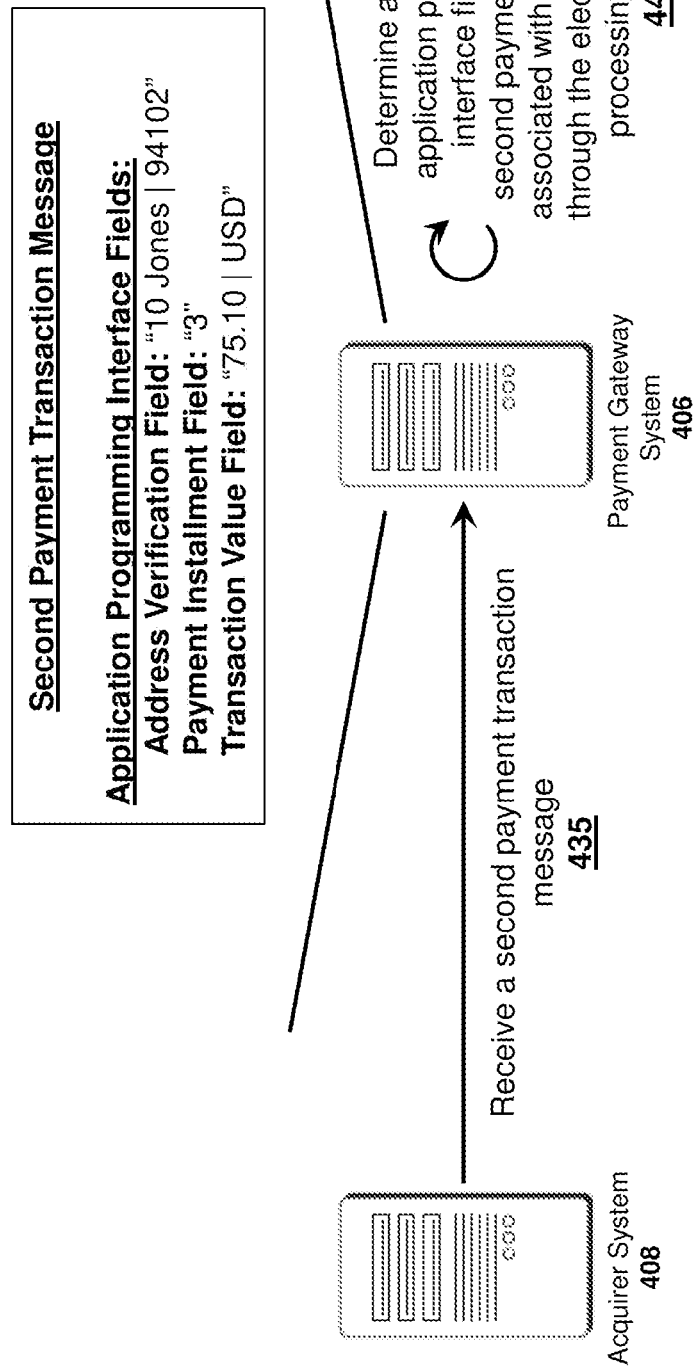

As shown by reference number 435 in FIG. 4C, payment gateway system 406 may receive a second payment transaction message from acquirer system 408. For example, payment gateway system 406 may receive a second payment transaction message from acquirer system 408 based on acquirer system 408 receiving data associated with the second payment transaction different from the payment transaction associated with the first payment transaction message. In such an example, payment gateway system 406 may receive the second payment transaction message from acquirer system 408 based on acquirer system 408 receiving data associated with the second payment transaction from a merchant system (e.g., merchant system 104 and/or a different merchant system) after the merchant system communicates with a user device (e.g., user device 102 and/or a different user device) to initiate the second payment transaction.

As shown by reference number 440 in FIG. 4C, payment gateway system 406 may determine a plurality of API fields. For example, payment gateway system 406 may determine a plurality of API fields of the second payment transaction message. In such an example, payment gateway system 406 may determine the plurality of API fields of the second payment transaction message where the second payment transaction message is associated with a second route through the electronic payment processing network.

As shown by reference number 445 in FIG. 4D, payment gateway system 406 may compare the plurality of API fields of the first payment transaction message to the plurality of API fields of the second payment transaction message. For example, payment gateway system 406 may compare the one or more API fields of the first payment transaction message to the one or more API fields of the second payment transaction message and payment gateway system 406 may determine that one or more API fields of the first payment transaction message are associated with and/or are not associated with one or more API fields of the second payment transaction message.

As shown by reference number 450 in FIG. 4E, payment gateway system 406 may determine one or more API fields to be modified. For example, payment gateway system 406 may determine one or more API fields to modify of the second payment transaction message based on comparing the plurality of API fields of the first payment transaction message to the plurality of API fields of the second payment transaction message.

As shown by reference number 455 in FIG. 4F, payment gateway system 406 may modify one or more API fields of the second payment transaction message. For example, payment gateway system 406 may modify the one or more API fields of the second payment transaction message based on payment gateway system 406 determining the one or more fields of the second payment transaction message to modify. In some non-limiting embodiments or aspects, payment gateway system 406 may include and/or remove an API field from the second payment transaction message. For example, payment gateway system 406 may include an API field in the second payment transaction message that is the same as or similar to an API field included in the first payment transaction message. In an example where payment gateway system 406 includes the API field in the second payment transaction, payment gateway system 406 may determine a value associated with the API field that was included in the second payment transaction message, the value determined based on the data associated with the payment transaction of the second payment transaction message and/or a default value. In some non-limiting embodiments or aspects, payment gateway system 406 may receive input (e.g., at payment gateway system 406) representing one or more new mandates (e.g., one or more API fields) that are to be included or not included in payment transaction messages transmitted along one or more routes of the electronic payment processing network.

Figure 4G:
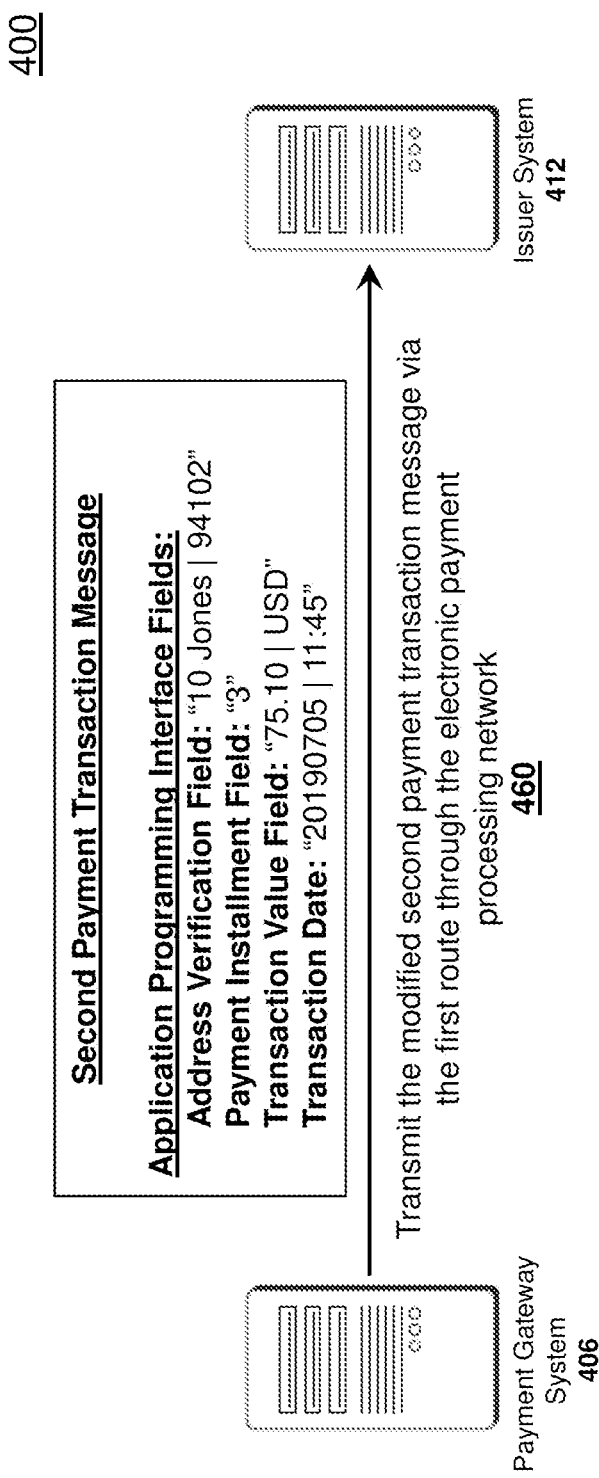

As shown by reference number 460 in FIG. 4G, payment gateway system 406 may transmit the modified second payment transaction message. For example, payment gateway system 406 may transmit the modified second payment transaction message via the first route through the electronic payment processing network. In such an example, payment gateway system 406 may transmit the modified second payment transaction message via the first route through the electronic payment processing network based on payment gateway system 406 modifying the second payment transaction message. In some non-limiting embodiments or aspects, after payment gateway system 406 modifies the payment transaction message, payment gateway system 406 may transmit the modified second payment transaction message via the second route through the payment processing network. In some non-limiting embodiments or aspects, payment gateway system 406 may transmit the second payment transaction message along the first route or the second route through the electronic payment processing network based on payment gateway system 406 determining that the first route or the second route through the electronic payment processing network is associated with a higher success rate for processing payment transactions. For example, payment gateway system 406 may transmit the second payment transaction message along the first route or the second route through the electronic payment processing network based on payment gateway system 406 determining that the first route or the second route through the electronic payment processing network is associated with a higher success rate for processing payment transactions based on payment gateway system 406 determining that one or more payment transaction messages were successfully processed when transmitted along the first route and the second route through the electronic payment processing network.

In some non-limiting embodiments or aspects, payment gateway system 406 may generate a message including data associated with the modification of the second payment transaction message and payment gateway system 406 may transmit the message to acquirer system 408. Acquirer system 408 may then modify one or more payment transaction messages generated after the second payment transaction message was generated based on the modification of the second payment transaction message.

Although the above methods, systems, and computer program products have been described in detail for the purpose of illustration based on what is currently considered to be the most practical and preferred embodiments or aspects, it is to be understood that such detail is solely for that purpose and that the present disclosure is not limited to the described embodiments or aspects but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A method, comprising:
receiving, with at least one processor, a first payment transaction message, wherein the first payment transaction message comprises data associated with a first payment transaction involving a user associated with a user device and a merchant associated with a merchant system, and wherein the first payment transaction message conforms to a message standard for a message that is communicated across an electronic payment processing network;
determining, with at least one processor, one or more values of fields of the first payment transaction message based on the data associated with the payment transaction, wherein the one or more values of fields of the first payment transaction message are associated with a first route of the first payment transaction message through an electronic payment processing network;
receiving, with at least one processor, a second payment transaction message, wherein the second payment transaction message comprises data associated with a second payment transaction involving the user associated with the user device and the merchant associated with the merchant system, and wherein the second payment transaction message conforms to the message standard;
determining, with at least one processor, one or more values of fields of the second payment transaction message to be modified based on the one or more values of fields of the first payment transaction message; and
transmitting, with at least one processor, a modified second payment transaction message via the first route through the electronic payment processing network.

2. The method of claim 1, further comprising:
determining a value of a field requirement associated with the second payment transaction message based on the data associated with the second payment transaction; and
comparing the value of the field requirement to the one or more values of fields of the second payment transaction message,
wherein determining the one or more values of fields of the second payment transaction message to be modified comprises:
determining the one or more values of fields of the second payment transaction message to be modified based on comparing the value of the field requirement to the one or more values of fields of the second payment transaction message.

3. The method of claim 1, further comprising:
comparing the one or more values of fields of the first payment transaction message to the one or more values of fields of the second payment transaction message,
wherein determining the one or more values of fields of the second payment transaction message to be modified comprises:
determining the one or more values of fields of the second payment transaction message to be modified based on comparing the one or more values of fields of the first payment transaction message to the one or more values of fields of the second payment transaction message.

4. The method of claim 1, further comprising:
modifying one or more values of merchant fields of the one or more values of fields of the second payment transaction message to provide the modified second payment message, wherein the one or more values of merchant fields are associated with the merchant that transmitted the second payment transaction message, and
wherein transmitting the modified second payment transaction message comprises:
transmitting the modified second payment transaction message based on the one or more values of merchant fields of the one or more values of fields of the second payment transaction message.

5. The method of claim 1, wherein the one or more values of fields comprises at least one of:
a value of an address verification system (AVS) field;
a value of a payment installment field; or
any combination thereof.

6. The method of claim 1, wherein determining the one or more values of fields of the second payment transaction message to be modified comprises:
determining the one or more values of fields of the second payment transaction message to be modified based on a value of a field requirement associated with the merchant that transmitted the second payment transaction message.

7. The method of claim 1, further comprising:
modifying the one or more values of fields of the second payment transaction message independent of modifying a payload of the second payment transaction message to provide the modified second payment transaction message.

8. A system, comprising:
at least one processor programmed or configured to:
receive a first payment transaction message, wherein the first payment transaction message comprises data associated with a first payment transaction involving a user associated with a user device and a merchant associated with a merchant system, and wherein the first payment transaction message conforms to a message standard for a message that is communicated across an electronic payment processing network;
determine one or more values of fields of the first payment transaction message based on the data associated with the payment transaction, wherein the one or more values of fields of the first payment transaction message are associated with a first route of the first payment transaction message through an electronic payment processing network;
receive a second payment transaction message, wherein the second payment transaction message comprises data associated with a second payment transaction involving the user associated with the user device and the merchant associated with the merchant system, and wherein the second payment transaction message conforms to the message standard;

determine one or more values of fields of the second payment transaction message to be modified based on the one or more values of fields of the first payment transaction message; and transmit a modified second payment transaction message via the first route through the electronic payment processing network.

9. The system of claim 8, wherein the at least one processor is further programmed or configured to:

determine a value of a field requirement associated with the second payment transaction message based on the data associated with the second payment transaction; and compare the value of the field requirement to the one or more values of fields of the second payment transaction message, wherein, when determining the one or more values of fields of the second payment transaction message to be modified, the at least one processor is programmed or configured to:

determine the one or more values of fields of the second payment transaction message to be modified based on comparing the value of the field requirement to the one or more values of fields of the second payment transaction message.

10. The system of claim 8, wherein the at least one processor is further programmed or configured to:

compare the one or more values of fields of the first payment transaction message to the one or more values of fields of the second payment transaction message, wherein, when determining the one or more values of fields of the second payment transaction message to be modified, the at least one processor is programmed or configured to:

determine the one or more values of fields of the second payment transaction message to be modified based on comparing the one or more values of fields of the first payment transaction message to the one or more values of fields of the second payment transaction message.

11. The system of claim 8, wherein the one or more values of fields comprises at least one of:

a value of an address verification system (AVS) field;
a value of a payment installment field; or
any combination thereof.

12. The system of claim 8, wherein the at least one processor is further programmed or configured to:

determine the one or more values of fields of the second payment transaction message to be modified based on a value of a field requirement associated with the merchant that transmitted the second payment transaction message.

13. The system of claim 8, wherein the at least one processor is further programmed or configured to:

modify the one or more values of fields of the second payment transaction message independent of modifying a payload of the second payment transaction message to provide the modified second payment transaction message.

14. The system of claim 8, wherein the at least one processor is further programmed or configured to:

modify one or more values of merchant fields of the one or more values of fields of the second payment transaction message to provide the modified second payment message, wherein the one or more values of merchant fields are associated with the merchant that transmitted the second payment transaction message, and wherein, when transmitting the modified second payment transaction message, the at least one processor is programmed or configured to:

transmit the modified second payment transaction message based on the one or more values of merchant fields of the one or more values of fields of the second payment transaction message.

15. A computer program product comprising at least one non-transitory computer-readable medium comprising one or more instructions that, when executed by at least one processor, cause the at least one processor to:

receive a first payment transaction message, wherein the first payment transaction message comprises data associated with a first payment transaction involving a user associated with a user device and a merchant associated with a merchant system, and wherein the first payment transaction message conforms to a message standard for a message that is communicated across an electronic payment processing network;

determine one or more values of fields of the first payment transaction message based on the data associated with the payment transaction, wherein the one or more values of fields of the first payment transaction message are associated with a first route of the first payment transaction message through an electronic payment processing network;

receive a second payment transaction message, wherein the second payment transaction message comprises data associated with a second payment transaction involving the user associated with the user device and the merchant associated with the merchant system, and wherein the second payment transaction message conforms to the message standard;

determine one or more values of fields of the second payment transaction message to be modified based on the one or more values of fields of the first payment transaction message; and transmit a modified second payment transaction message via the first route through the electronic payment processing network.

16. The computer program product of claim 15, wherein the one or more instructions further cause the at least one processor to:

determine a value of a field requirement associated with the second payment transaction message based on the data associated with the second payment transaction; and compare the value of the field requirement to the one or more values of fields of the second payment transaction message, wherein, the one or more instructions that cause the at least one processor to determine the one or more values of fields of the second payment transaction message to be modified, cause the at least one processor to:

determine the one or more values of fields of the second payment transaction message to be modified based on comparing the value of the field requirement to the one or more values of fields of the second payment transaction message.

17. The computer program product of claim 15, wherein the one or more instructions further cause the at least one processor to:

compare the one or more values of fields of the first payment transaction message to the one or more values of fields of the second payment transaction message,
wherein, the one or more instructions that cause the at least one processor to determine the one or more values of fields of the second payment transaction message to be modified, cause the at least one processor to:
determine the one or more values of fields of the second payment transaction message to be modified based on comparing the one or more values of fields of the first payment transaction message to the one or more values of fields of the second payment transaction message.

18. The computer program product of claim 15, wherein the one or more instructions further cause the at least one processor to:
modify one or more merchant fields of the one or more values of fields of the second payment transaction message, wherein the one or more merchant fields are associated with the merchant that transmitted the second payment transaction message, and wherein, the one or more instructions that cause the at least one processor to transmit the modified second payment transaction message, cause the at least one processor to:
transmit the modified second payment transaction message based on a route through the electronic payment processing network associated with the merchant.

19. The computer program product of claim 15, wherein the one or more values of fields comprises at least one of:
a value of an address verification system (AVS) field;
a value of a payment installment field; or
any combination thereof.

20. The computer program product of claim 15, wherein the one or more instructions further cause the at least one processor to:
modify the one or more values of fields of the second payment transaction message independent of modifying a payload of the second payment transaction message to provide the modified second payment transaction message.

\* \* \* \* \*